United States Patent
Shih et al.

[11] Patent Number: 6,067,811
[45] Date of Patent: May 30, 2000

[54] AIRTIGHT HIGH HUMIDITY COLD STORAGE WITH DRAWERS

[76] Inventors: Shu-Yen Peng Shih; Chao-Chang Shih, both of No. 77, Yung-Tung St., South Dist., Taichung, Taiwan

[21] Appl. No.: 09/239,059

[22] Filed: Jan. 27, 1999

[51] Int. Cl.[7] .................................................. F25D 23/12
[52] U.S. Cl. .............................. 62/259.1; 62/302; 62/440
[58] Field of Search ................................... 62/359.1, 302, 62/440

[56] References Cited

U.S. PATENT DOCUMENTS

| | | | |
|---|---|---|---|
| 2,198,239 | 4/1940 | Baird . | |
| 2,437,215 | 3/1948 | Wheeler et al. . | |
| 2,437,451 | 3/1948 | Baird . | |
| 3,123,988 | 3/1964 | Richmam | 62/407 |
| 3,529,439 | 9/1970 | Brennan | 62/407 |
| 5,054,291 | 10/1991 | Davis et al. | 62/407 |
| 5,228,313 | 7/1993 | Okamoto et al. | 62/407 |
| 5,265,442 | 11/1993 | Lamie | 62/404 |
| 5,277,039 | 1/1994 | Haasis | 62/411 |
| 5,381,672 | 1/1995 | Haasis | 62/458 |

FOREIGN PATENT DOCUMENTS

| | | |
|---|---|---|
| 2007819 | 5/1979 | United Kingdom . |
| WO 97 17582 | 5/1997 | WIPO . |

*Primary Examiner*—Henry A. Bennett
*Assistant Examiner*—Mark Shulman
*Attorney, Agent, or Firm*—Kolisch Hartwell Dickinson McCormack & Heuser

[57] ABSTRACT

A cold storage includes a room having a peripheral wall, and a plurality of cold storage container modules each received in the room and each including a plurality of hollow cold storage containers each having an open end wall attached to and flush with the outside of the peripheral wall of the room. Each of the cold storage containers includes a drawer slidably mounted therein and extending outward from the open end wall thereof.

10 Claims, 3 Drawing Sheets

AIRTIGHT HIGH HUMIDITY COLD STORAGE WITH DRAWERS

CROSS-REFERENCES TO RELATED APPLICATIONS

Not Applicable.

BACKGROUND OF THE INVENTION

1. Field of the Invention

The present invention relates to a cold storage, and more particularly to a drawable airtight cold storage with a high humidity.

2. Description of the Related Art

A conventional cold storage in accordance with the prior art can be used to store objects such as vegetables, fruit, flowers and the like so as to preserve the freshness of the objects. However, cold air supplied from a refrigeration unit contained in the cold storage is used to directly refrigerate the vegetables/fruit contained therein such that water contained in the vegetables/fruit escapes from the surface thereof, thereby decreasing the humidity in the cold storage, and thereby affecting the freshness of the vegetables/fruit.

When different kinds of vegetables/fruit are stored together in the cold storage, the different kinds of vegetables/fruit will cause the oxygen and carbon dioxide contents in the cold storage to vary due to the mutual interference of the different kinds of vegetables/fruit, thereby changing the relative proportion of oxygen to carbon dioxide such that it is necessary to provide air control equipment to maintain the relative proportion of oxygen to carbon dioxide in the cold storage container to a constant value, thereby increasing the manufacturing cost. In addition, when the concentration of oxygen is increased, and that of carbon dioxide is decreased, an amount of ethylene will be produced in the vegetables/fruit such that it is necessary to use an ethylene absorbing agent or ethylene decomposing device which cannot be reused, thereby causing environmental pollution.

Further, the cold air contained in the cold storage will escape to the environment when the door of the cold storage is opened to remove vegetables/fruit or to perform maintenance, thereby easily affecting the preservation of the vegetables/fruit.

The present invention has arisen to mitigate and/or obviate the disadvantage of the conventional cold storage.

BRIEF SUMMARY OF THE INVENTION

In accordance with one aspect of the present invention, there is provided a cold storage comprising: a room including a peripheral wall; an insulated layer attached to the inside of the peripheral wall of the room; a refrigeration unit attached to the peripheral wall of the room and connecting to the inside of the room; a door attached to the peripheral wall of the room for connecting the room to the outside; and a plurality of cold storage container modules each received in the room and each including a plurality of hollow cold storage containers each having an open end wall attached to and flush with the outside of the peripheral wall of the room, and each of the cold storage containers including a drawer slidably mounted therein and extending outward from the open end wall thereof.

A ventilating duct is mounted in the room and includes a plurality of vent channels contained therein, a connecting duct is mounted between the refrigeration unit and the ventilating duct, and a plurality of fans are each mounted in the room and each located adjacent to one of the corresponding vent channels.

The drawer includes a end wall located adjacent to the open end wall of the cold storage container, and a cover plate mounted on the end wall of the drawer to overlap the open end wall of the cold storage container when the drawer is retracted into the cold storage container. Each of the cold storage containers includes a handle attached to the cover plate, and a gasket mounted to the insideperiphery of the cover plate.

A plurality of first snaps are each mounted on the open end wall thereof, and a plurality of second snaps are each mounted on the cover plate and are each engageable with one of the corresponding first snaps.

Further benefits and advantages of the present invention will become apparent after a careful reading of the detailed description with appropriate reference to the accompanying drawings.

DETAILED DESCRIPTION OF THE INVENTION

Figure 1:
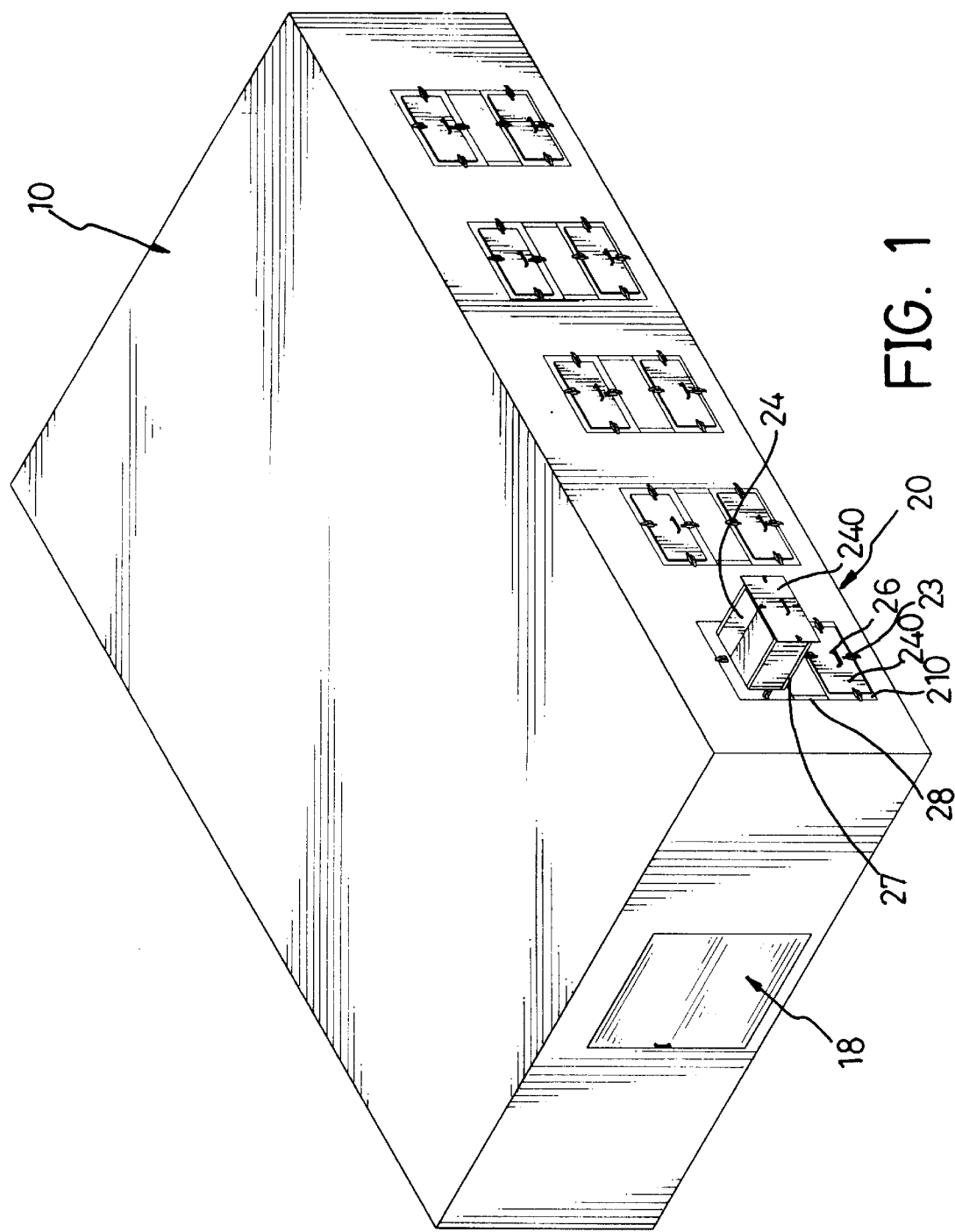
FIG. 1 is a perspective view of a cold storage with drawers in accordance with the present invention.
Figure 2:
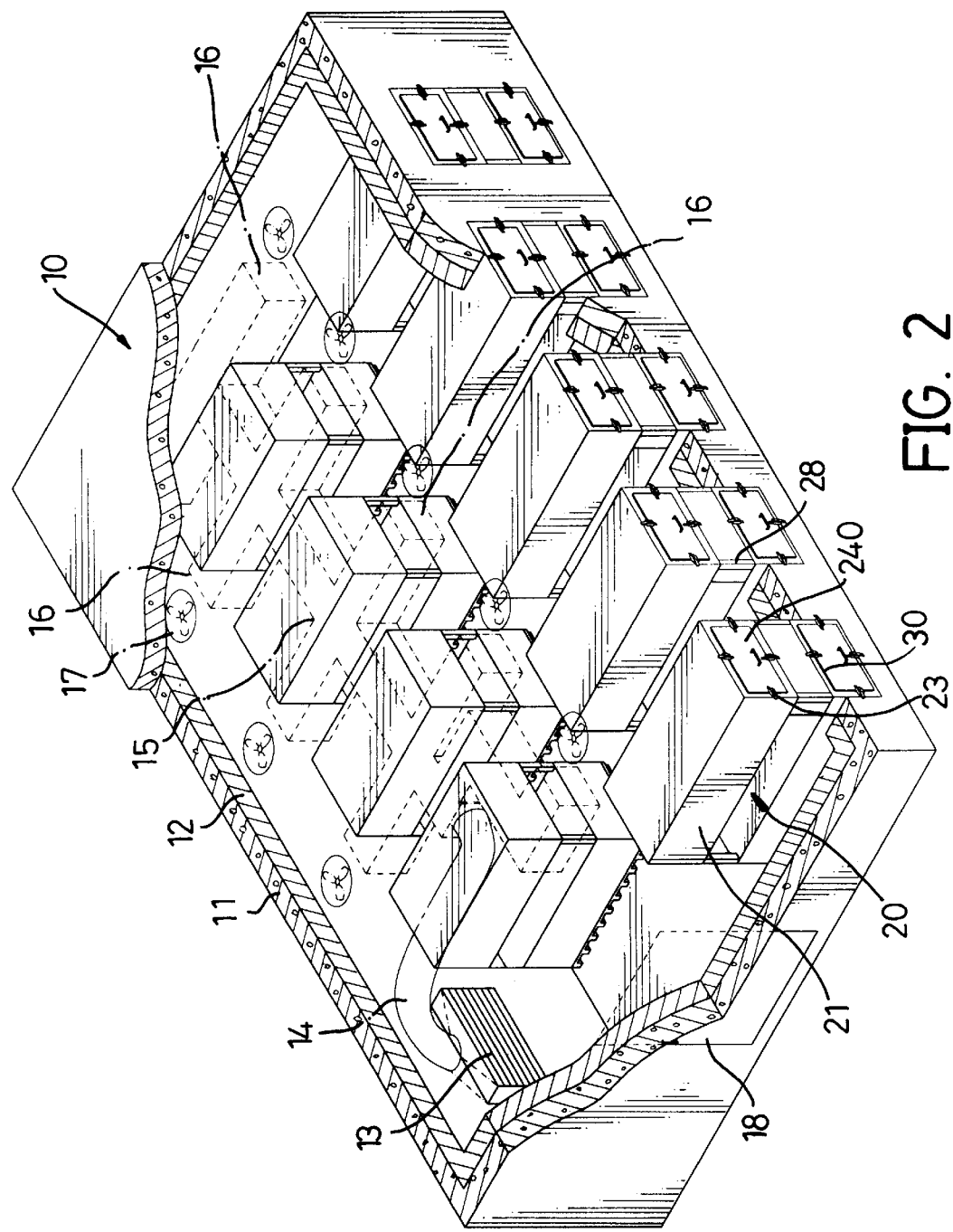
FIG. 2 is a perspective view in partial section of the cold storage with drawers as shown in FIG. 1.
Figure 3:
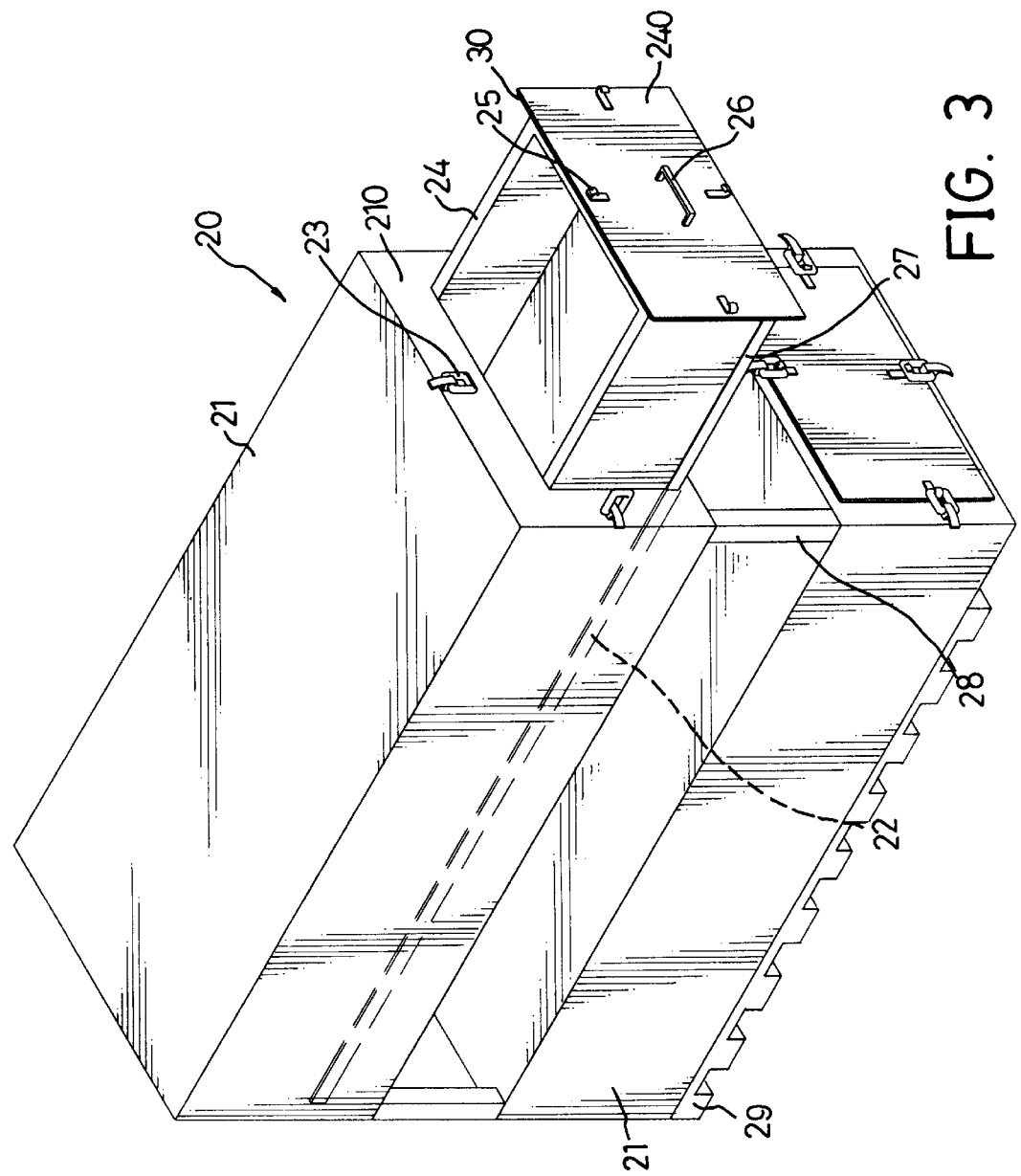
FIG. 3 is a perspective operational view of a cold storage container module in accordance with the present invention.

Referring to the drawings, a drawable airtight cold storage (10) with a high humidity in accordance with the present invention comprises a room (11) including peripheral walls, an insulated layer (12) covering the inside of the room (11) walls, a refrigeration unit (13) mounted on the peripheral wall of the room (11) and connecting to the inside of the room (11), a door (18) in the peripheral wall of the room (11) to connect the room (11) to outside, thereby allowing an operator to enter the room (11) of the cold storage (10), and a plurality of cold storage container modules (20) each received in the room (11) and each including a plurality of hollow cold storage containers (21) each having an open end wall (210) attached to and flush with the outside of the peripheral wall of the room (11), and each of the cold storage containers (21) including a drawer (24) slidably mounted therein and extending outward from the open end wall (210) thereof.

The cold storage (10) further comprises a ventilating duct (15) mounted in the top wall of the room (11) and-including a plurality of vent channels (16) contained therein, a connecting duct (14) mounted between the refrigeration unit (13) and the ventilating duct (15), and a plurality of fans (17) each mounted in the top wall of the room (11), and each located adjacent to one of the corresponding vent channels (16).

Each of the cold storage container modules (20) further includes a plurality of support stands (28) each mounted between two adjacent cold storage containers (21), thereby separating the cold storage containers (21) from each other. Each of the cold storage container modules (20) includes a bottom cold storage container (21), and further includes a pad (29) secured on the bottom of the bottom cold storage container (21). The pad (29) contains a plurality of vent apertures (not shown) therein so as to provide ventilating effect.

Each of the cold storage containers (21) has two side walls each containing an elongated slide groove (22) therein, and the drawer (24) has two side walls each mounted with an elongated slide track (27) slidably received in the slide groove (22) of one of the two corresponding side walls of the cold storage container (21) such that the drawer (24) can slide into and out of the cold storage container (21).

The drawer (24) of each of the cold storage containers (21) includes an end wall located adjacent to the open end wall (210) of the cold storage container (21), and a cover plate (240) mounted on the end wall of the drawer (24) to overlap the open end wall (210) of the cold storage container (21) when the drawer (24) is retracted into the cold storage container (21).

Each of the cold storage containers (21) further includes a handle (26) attached to the cover plate (240), and a gasket (30) mounted to the periphery of the cover plate (240). Each of the cold storage containers (21) further includes a plurality of first snaps (23) each mounted on the open end wall (210) thereof, and a plurality of second snaps (25) each mounted on the cover plate (240) and each engageable with one of the corresponding first snaps (23).

In practice, the cold storage (10) essentially comprises a plurality of cold storage container modules (20) each of which includes a plurality of cold storage containers (21) such that each of the cold storage containers (21) can be used to preserve vegetables/fruit of the same kinds so as to maintain the same kinds of vegetables/fruit at the same temperature, thereby preventing changing the relative proportion of oxygen to carbon dioxide contained in the cold storage container (21) due to the mutual interference of different kinds of vegetables/fruit.

At the same time, different kinds of vegetables/fruit are respectively preserved in different cold storage containers (21) each of which includes a drawer (24) closely received therein by means of the gasket (30) such that the oxygen and carbon dioxide content in the respective cold storage container (21) can be self adjusted by the vegetables/fruit under a condition of a low temperature, without the need to use air control equipment, thereby decreasing the manufacturing cost. In addition, the oxygen and carbon dioxide content in each of the cold storage containers (21) is substantially maintained constant, thereby decreasing the amount of ethylene produced by the vegetables/fruit to a minimum, obviating the need to use an ethylene absorbing agent or ethylene decomposing device, thereby preventing environmental pollution.

Further, cold air contained in the cold storage (10) room (11) does not directly contact the inside of the drawer (24) which is closely received in each of the cold storage containers (21) such that the vegetables/fruit contained in the drawer (24) can be indirectly refrigerated by the refrigeration unit (13), thereby preventing water contained in the vegetables/fruit in the drawer (24) from escaping from the cold storage container (21) such that the vapor contained in each of the cold storage containers (21) will maintain a nearly saturated state so as to satisfy the requirement of low temperature and high humidity, thereby maintaining the freshness of the vegetables/fruit.

Moreover, when the vegetables/fruit contained in the cold storage container (21) need to be removed, an operator just needs to pull the handle (26) so as to open the drawer (24) of one of the cold storage containers (21) by detaching the engagement of the snaps (23, 25). In such a manner, cold air contained in the room (11) will not escape to the environment since the inside of each of the cold storage containers (21) is not open to inside of the room (11) so the temperature in the room (11) is maintained at a constant value, thereby enhancing the preservation of the vegetables/fruit.

It should be clear to those skilled in the art that further embodiments may be made without departing from the scope and spirit of the present invention.

What is claimed is:

1. A cold storage comprising:
   a room including a peripheral wall; and
   a plurality of cold storage container modules each received in said room and each including a plurality of hollow cold storage containers each having
      an open end wall attached to and flush with the outside of said peripheral wall of said room, and having multiple first snaps mounted thereon; and including
      a drawer slidably mounted therein and extending outward from said open end wall thereof, including an end wall located adjacent said open end wall; and a cover plate mounted on said end wall of said drawer to overlap said open end wall of said cold storage container when said drawer is retracted into said cold storage container and having multiple second snaps mounted thereon and each engageable with one of said corresponding first snaps.

2. The cold storage in accordance with claim 1, further comprising a refrigeration unit attached to said peripheral wall of said room and connecting to the inside of said room.

3. The cold storage in accordance with claim 2, further comprising a ventilating duct mounted in said room and including a plurality of vent channels contained therein, a connecting duct mounted between said refrigeration unit and said ventilating duct, and a plurality of fans each mounted in said room and each located adjacent to one of said corresponding vent channels.

4. The cold storage in accordance with claim 1, further comprising a insulated layer attached to the inside of the said peripheral walls of said room.

5. The cold storage in accordance with claim 1, further comprising a door attached to said peripheral wall of said room for connecting said room to the outside.

6. The cold storage in accordance with claim 1, wherein each of said cold storage container modules further includes a plurality of support each mounted between two adjacent cold storage containers.

7. The cold storage in accordance with claim 1, wherein each of said cold storage containers includes two side walls each containing an elongated slide groove therein, and said drawer includes two side walls, each mounted with an elongated slide track slidably received in said slide groove of one of said two corresponding side walls of said cold storage container.

8. The cold storage in accordance with claim 1, wherein each of said cold storage container modules includes a bottom cold storage container, and further includes a pad secured on the bottom of said bottom cold storage container.

9. The cold storage in accordance with claim 1, wherein each of said cold storage containers further includes a handle attached to said cover plate.

10. The cold storage in accordance with claim 1, wherein each of said cold storage containers further includes a gasket mounted to the inside periphery of said cover plate.

\* \* \* \* \*